Patented May 20, 1947

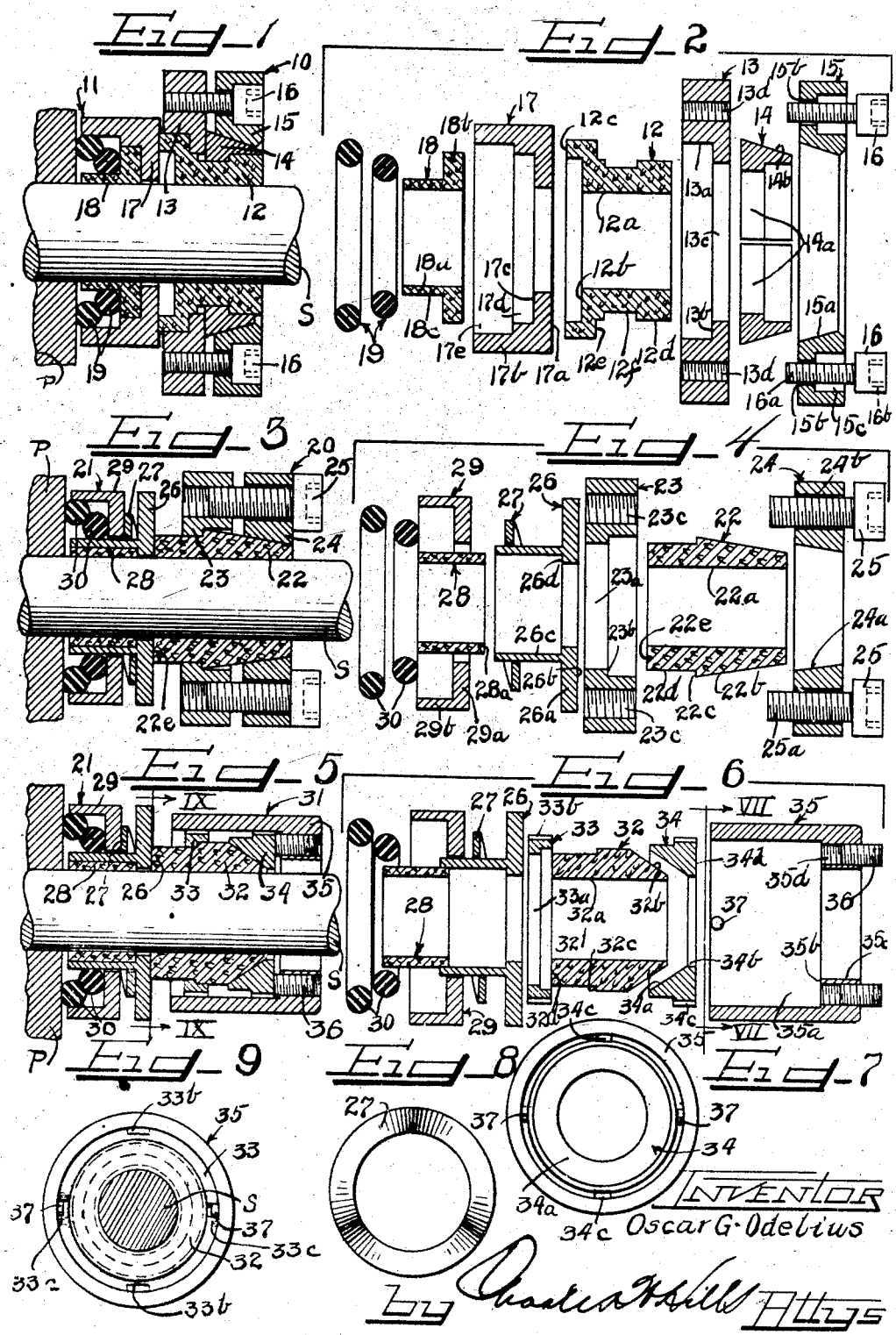

2,420,718

UNITED STATES PATENT OFFICE 2,420,718

SEAL CONSTRUCTION

Oscar G. Odelius, Chicago, Ill.

Application September 1, 1944, Serial No. 552,233

5 Claims. (Cl. 286—7)

This invention relates to seal constructions for relatively rotating parts and specifically the invention relates to shaft seals accommodating axial movement or end play of the shaft without interfering with the seal efficiency.

According to this invention, a hard, wearable non-swelling plastic composition bushing is fixedly clamped onto a shaft. The bushing has an end face arranged for riding on a metal member that freely embraces the shaft. This metal member is preferably seated on a plastic composition sleeve disposed around the shaft. This sleeve is slidable on the shaft.

The metal member is maintained in sealing relationship with a housing part, a bearing, or other body member receiving the shaft by means of a resilient seal arrangement preferably composed of rubber or rubber-like O rings. This resilient seal permits appreciable amounts of axial movement of the metal member on the shaft. If additional axial movement is desired, the metal member can be backed by a corrugated spring washer bottomed on a housing in which the O rings are mounted. The spring can be compressed to add to the permissible amount of movement of the metal member.

The plastic bushing is clamped on the shaft by means of a clamping ring which acts either directly on a beveled portion of the bushing to radially deform it into sealing engagement with the shaft, or acts on split ferrule rings which radially deform the bushing on the shaft.

It is, then, an object of the preesnt invention to provide seal constructions for relatively movable parts which include a plastic composition bushing sealingly clamped on one of the parts and riding on a resiliently urged metal part sealingly engaging the relatively moving part to be sealed.

A further object of the invention is to provide a seal construction for relatively rotating parts including a rotating seal part and clamping means for causing it to sealingly engage the rotating part together with a non-rotating seal part maintained in sealing relationship with the stationary part to be sealed by means of resilient gaskets.

A further object of the invention is to provide a shaft seal which accommodates appreciable amounts of end play or axial movement of the shaft without interfering with the efficiency of the seal.

A still further object of the invention is to provide an O ring equipped seal arrangement for shaft seals.

A specific object of the invention is to provide a shaft seal having a deformable plastic bushing sealingly clamped on a shaft by means of a clamping ring arrangement, and a non-rotating cooperating seal member for riding on an end face of the bushing having O rings sealingly connecting it to a stationary part receiving the shaft.

Other and further objects of the invention will be apparent to those skilled in the art from the following detailed description of the annexed sheet of drawings which, by way of preferred examples only, illustrates several embodiments of the invention.

On the drawings:

Figure 1 is a vertical cross-sectional view, with parts in elevation, of one form of seal construction according to this invention, mounted in sealing relationship on a shaft.

Figure 2 is an exploded vertical cross-sectional view, with parts in elevation, of the seal parts of Figure 1.

Figure 3 is a view similar to Figure 1 illustrating a modified form of shaft seal according to this invention accommodating increased axial movement of the shaft.

Figure 4 is an exploded vertical cross-sectional view, with parts in elevation, of the parts of the seal of Figure 3.

Figure 5 is a view similar to Figure 1 illustrating a still further modified form of seal construction according to this invention.

Figure 6 is an exploded vertical cross-sectional view with parts in elevation, of the parts of the seal of Figure 5.

Figure 7 is an end elevational view of the housing for the seal of Figures 5 and 6 taken along the line VII—VII of Figure 6 but illustrating the clamping ring seated in the housing.

Figure 8 is a plan view of a corrugated spring washer used in the seal constructions of Figures 3 to 6.

Figure 9 is an end elevational view of the ferrule and bushing assembly of the seal construction of Figures 5 and 6 taken substantially along the line IX—IX of Figure 5.

As shown on the drawings:

In the embodiment of the invention shown in Figures 1 and 2, the seal is composed of an assembly 10 clamped on a shaft S for rotation therewith and an assembly 11 in fixed sealing relationship with a stationary part P through which the shaft S extends.

The rotating part 10 of the seal is composed of a hard, wearable non-metallic plastic bushing 12, a retainer ring 13, a pair of metal ferrules 14, a clamping ring 15, and a plurality of screws 16 for drawing the clamping ring toward the retainer ring to radially load the ferrule rings and cause the bushing to be deformed into clamped sealing engagement with the shaft.

The non-rotating sealing assembly 11 is composed of a metal member 17 with a hardened polished end face for riding on the end face of the bushing 12, a plastic material sleeve 18 fitting within the member 17 to slidably carry it on the shaft S, and a pair of rubber O rings 19 disposed between the sleeve 18 and the member 17 and acting on the part P to sealingly connect the member 17 with the part P while allowing axial movement of the member 17 on the shaft.

The bushing 12 has a cylindrical bore 12a therethrough snugly fitting the shaft S together with an enlarged portion 12b at one end of the bore. The enlarged portion 12b is of larger diameter than the shaft. An end face 12c is provided on the bushing 12 around the recess or enlarged portion 12b. The bushing has a reduced-diameter portion 12d thereon extending from a flat shoulder 12e at the large end of the bushing. A groove 12f is formed around the small diameter portion 12d of the bushing adjacent the shoulder 12e.

The retainer ring 13 has a recess 13a therein adapted to receive the enlarged end of the bushing 12. The recess 13a is bottomed by a flat shoulder 13b adapted to seat on the shoulder 12e of the bushing. The ring has a bore 13c therethrough adapted to snugly fit over the reduced-diameter portion 12d of the bushing. A plurality of threaded holes 13d surround the recess and bore of the ring at spaced intervals. Four such holes are usually provided.

The two ferrules 14 have inturned beaded portions or flanges 14a fitting in the groove 12f of the bushing, together with tapered outer faces 14b. When seated in the groove 12f of the bushing, the ferrules 14 are spaced apart slightly so that they can be drawn together for radially deforming the bushing.

The clamping ring 15 has a tapered bore 15a therethrough adapted to receive the tapered faces 14b of the ferrules 14. The ring 15 also has bores 15b at spaced intervals around its marginal peripheral portion for mating with the holes 13d of the retainer. Each of these bores 15b has enlarged recesses 15c. The bores 15b freely receive the shanks 16a of the screws while the recesses 15c receive the socket heads 16b of the screws 16.

To assemble the parts of the assembly 10, the retainer ring 13 is slipped over the bushing 12 and has the shoulder 13b thereof bottomed on the shoulder 12e of the bushing 12. The ferrules 14 are then inserted in the groove 12f of the bushing 12 and the retainer is held against axial movement on the bushing between the shoulder 12e and the end faces of the ferrules. The clamping ring 15 is then disposed around the ferrule pieces 14 to hold the same on the bushing. The shanks 16a of the screws 16 are threaded into the threaded holes 13d of the retainer ring to draw the clamping ring toward the retainer ring. This radially loads the bushing 12 to deform it so that the bore 12a thereof will sealingly engage the shaft S and the bushing will be held against axial movement on the shaft.

The metal member 17 has an apertured end wall providing an end face 17a for sliding sealing engagement with the end face 12c of the bushing 12. This end face is preferably hardened and ground and lapped to a true smooth finish so as to have good sealing contact with the bushing. The member 17 has a skirt 17b depending from the end face 17a thereof and a shoulder 17c is provided at the inner end of the skirt. A recess 17d is provided adjacent the shoulder 17c and a larger recess 17e extends from the recess 17d to the end of the skirt.

The sleeve 18 has a cylindrical bore 18a therethrough sized for a sliding fit on the shaft S. The sleeve has an outturned flange 18b thereon at one end thereof adapted to fit in the recess 17d of the member 17 and be bottomed on the shoulder 17c thereof.

The sleeve 18 has a cylindrical portion 18c extending through the recess 17e of the member 17 and cooperating with the skirt 17b of the member 17 to define a chamber which receives the O rings 19. As illustrated, one O ring is of smaller diameter than the other O ring and fits rather snugly around the portion 18c of the sleeve. The other O ring fits rather snugly within the recess 17e of the member 17. The outer diameter of the small O ring, however, is larger than the inner diameter of the large O ring, so that the two rings will be abutted together as illustrated in Figure 1 to form an expansible and contractible sleeve sealingly connecting the assembly 11 with the part P.

Leakage through the part P along the shaft S is therefore stopped by the O rings 19 in the assembly 11, and any leakage along the shaft through this assembly is stopped by the sliding contacting areas of the member 17 and bushing 12. Leakage through the bushing 12, of course, is eliminated by the clamping sealing fit on the shaft S.

The shaft S can move axially relative to the part P without interfering with the sealing efficiency because the O rings 19 are resilient and can be deformed by interparticle flow of rubber, permitting the shaft to slide through the sleeve 18 without breaking the seal. Thus, the shaft S can slide into the part P and the O rings 19 will be deformed to permit the assembly 11 to be moved closer to the part P.

Alternatively the shaft S can slide further out of the part P and the partially deformed O rings can resiliently expand to permit movement of the assembly 11 away from the part P without breaking sealing relationship therewith. In normal operation, the O rings are partially deformed as shown in Figure 1.

The bushing 12 and the sleeve 18 are preferably composed of hard wearable, non-swelling, non-metallic material capable of being deformed to be clamped on the shaft S. Plastic compositions, laminates, compressed fiber, and the like materials are operative. A very satisfactory bushing and sleeve material is a phenol-formaldehyde plastic known to the trade as "Textolite."

In the embodiment of the invention shown in Figures 3 and 4, the metal ferrules 14 of the seal assembly of Figures 1 and 2 are eliminated and a spring washer impelled metal seal element is used for sliding sealing engagement with the plastic bushing. As shown in Figures 3 and 4, a rotating seal assembly 20 is clamped on the shaft S and cooperates with a stationary seal assembly 21 in sealing relationship with the part P, and slidable on the shaft S.

The assembly 20 includes a non-metallic plastic composition bushing 22, a metal retainer ring 23, a clamping ring 24, and screws 25 to draw the clamping ring toward the retainer.

The non-rotating seal assembly 21 is composed of a metal seal part 26 for sliding sealing engagement with the bushing 22, a corrugated spring washer 27, a non-metallic plastic composition sleeve 28, a metal casing 29, and a pair of O rings 30.

The bushing 22 has a cylindrical bore 22a therethrough adapted to snugly receive the shaft S. The bushing 22 has a tapered outer face portion 22b diverging from one end thereof to a vertical shoulder 22c. A straight cylindrical portion 22d extends from the shoulder 22c. An end face 22e is provided on the end of the bushing to form the active sealing end thereof.

The ring 23 has an aperture 23a therethrough adapted to receive the cylindrical portion 22d of the bushing, and a shoulder 23b adapted to be bottomed on the shoulder 22c of the bushing.

Several threaded holes 23c are provided through the retainer 23 around the marginal peripheral portion thereof. The clamping ring 24 has a tapered internal bore 24a adapted to fit on the tapered face 22b of the bushing 22, together with a plurality of bores 24b around the marginal peripheral portion thereof receiving the threaded shanks 25a of the socket head screws 25.

With the cylindrical portion of the bushing seated in the aperture 23a of the retainer 23, and the retainer bottomed on the shoulder 22c of the bushing, the clamping ring placed on the tapered face 22b of the bushing can be drawn toward the retainer by the screws 25 to radially load the bushing and deform the bore 22a thereof into sealing clamping engagement with the shaft S.

Sealing member 26 of the stationary seal assembly 21 has an apertured end wall 26a with a lapped and polished end face 26b for riding on the end face 22e of the bushing. As shown in Figure 3, this end face 22e of the bushing is positioned beyond the retainer 23.

The member 26 has a cylindrical sleeve portion 26c adapted to freely receive the shaft S therethrough and to cooperate with the aperture in the end wall 26a to provide an internal shoulder 26d. The non-metallic plastic composition sleeve 28 fits in the cylindrical portion 26e of the member 26 and has an end wall 28a adapted to be bottomed on the shoulder 26d.

The corrugated spring washer 27 fits freely around the cylindrical portion 26c of the member 26, and acts on the end wall 26a thereof and on the end wall 29a of the casing member 29. This end wall 29a has an aperture therethrough freely receiving the portion 26c. A skirt 29b of the casing 29 cooperates with the portion 26c to form a chamber for the O rings 30.

The large-diameter O ring 30 is bottomed on the part P within the casing 29 and the small diameter O ring is snugly disposed around the portion 26c of the member 26. The casing 21 can move axially along the shaft S relative to the part P by deformation of the O rings 30. In addition, the seal part 26 can move relative to the casing 21 on the shaft S since the sleeve 28 is freely slidable on the shaft. Spring washer 27 can be deformed and expanded to permit this relative movement between the seal part 26 and casing 29.

The seal part 20 clamped on the shaft S, of course, moves with the shaft and, in the event of axial movement of the shaft, the sliding sealing contact between the end faces 26b of the seal member 26 and 22e of the bushing 22 is maintained by deformation of the O rings 30 and the spring washer 27. The seal operates the same as the seal described in Figures 1 and 2 but accommodates additional movement of the shaft in view of the added spring 27 and separated casing part 29 and member 26.

In the embodiment of the invention shown in Figures 5 to 9, the seal is composed of a rotating seal assembly 31 and the same stationary seal assembly 21 as described in connection with Figures 3 and 4. The parts of the assembly 21 in Figures 5 and 6 have been identified with the same reference numerals used in Figures 3 and 4.

The assembly 31 is composed of a non-metallic plastic composition bushing 32, a single metal ferrule ring 33, a clamping ring 34, a housing 35 and a plurality of locking screws 36.

The bushing 32 has a cylindrical bore 32a therethrough adapted to snugly fit on the shaft S, together with a tapered end wall 32b, a flat shoulder 32c at the large end of the tapered portion, and a flat end face 32d opposite the end wall 32b. The taper of the end wall 32b is sufficiently abrupt so that the clamp ring will not stick on the bushing when screw pressure is released.

The ferrule ring 33, as better shown in Figure 9, fits around the bushing 32 and, as shown in Figure 6, has an inturned flange 33a bottomed on the shoulder 32c as illustrated in Figure 5.

As shown in Figure 9 the ferrule has diametrically opposed grooves 33b. The end face of the ring 33 is notched as at 33c in spaced relation from the grooves 33b.

The clamping ring 34 has a tapered bore 34a adapted to seat on the end face 32b of the bushing 32 together with a cylindrical bore 34b adapted to freely receive the shaft S therethrough. The ring 34 has diametrically opposed grooves 34c in its outer periphery for a purpose to be described.

The clamping ring 34 has an end wall 34d adapted to be acted on by the clamping screws 36.

The housing 35 has a cylindrical recess 35a extending inwardly from one end thereof to a shoulder 35b and a bore 35c extends through to the other end of the housing. This bore 35c is larger than the shaft S. The housing thus has an end wall. The end wall has internally threaded bores 35d at spaced intervals therearound receiving the screws 36.

Pins 37 are secured in the open end of the housing 35 and project into the mouth of the chamber 35a thereof.

The clamping ring 34 is adapted to be seated in the chamber 35 and can be passed between the pins 37 when its grooves 34c are positioned to receive the inner ends of the pins. The face 34d of the clamping ring is bottomed on the shoulder 35b of the housing.

The ferrule ring 33 seated around the bushing 32 is insertable into the housing 35 between the pins 37 when the grooves 33b are positioned to receive the inner ends of the pins. After seating the bushing with the ferrule ring thereon in the housing, the bushing and ferrule ring are rotated to seat the pins 37 in the recesses 33c of the ring. The screws 36 are then threaded through the holes 35d to act on the end face 34d of the clamping ring 34 and force this clamping ring on the tapered end 32b of the bushing to inwardly deform the bushing into sealing relationship on the shaft S. The pins seated in the recesses 33c of the ferrules will prevent axial movement of the bushing out of the housing. In this manner, the assembly 31 is clamped on the shaft S in sealing relationship therewith.

The end face 32d of the bushing 32 rides on the end face of the member 26 and the seal construction operates in the same manner as described in connection with Figures 3 and 4.

The housing 35, in carrying the screws 36 in an end face thereof, makes possible a reduction in diameter for the rotating seal assembly 31 since, in the rotating seal assemblies 10 and 20 of Figures 1 to 4, the clamping screws surround the tapered bore of the clamping ring whereas, in the embodiment of Figures 5 to 9, the clamping screws can be axially aligned with the tapered bore of the clamping ring.

From the above description it will be understood that the seal constructions of this invention are of the sliding face-to-face engagement type and include a rotating assembly which is clamped on a shaft, together with a stationary assembly which is axially movable relative to the shaft and is in sealing relationship with a stationary part and the rotating seal assembly. The seals of this invention thus accommodate axial movement of the shaft relative to the parts engaged by the stationary seal assembly without in any way disrupting the sealing efficiency.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A seal construction adapted to seal a shaft relative to a stationary part through which the shaft projects while accommodating relative axial movements between said shaft and part which comprises a plastic composition bushing having an active sealing end face, means sealingly clamping said plastic composition bushing on said shaft, a stationary seal member having an active end face for sliding sealing engagement with the active end face of the bushing, said stationary seal member receiving said shaft freely therethrough, a plastic composition sleeve slidably carrying said stationary seal member on said shaft, and a plurality of rubber O rings disposed around said sleeve in sealing engagement with each other and sealingly connecting said part and said sleeve, said rubber rings being loaded to urge the stationary seal member against the active end face of the bushing.

2. A seal construction for a shaft and a part receiving the shaft which comprises a plastic composition bushing on said shaft, means for radially deforming said bushing into sealing relationship around said shaft, said bushing having an active end face, a seal part slidable on said shaft and having an end face in opposed relationship to said active end face of the bushing, and an O ring assembly disposed around said shaft between said seal part and said part receiving the shaft for sealingly connecting said seal part and said part receiving the shaft, said O ring assembly being deformable to accommodate movement of the seal part toward and away from the part receiving the shaft, and said bushing being positioned on said shaft to load the O ring assembly and hold the active end face thereof in riding sealing engagement with the end face of the seal part whereby said loaded O ring assembly will maintain said faces in sealing relationship.

3. A shaft seal for sealingly connecting a shaft with a part through which the shaft extends, comprising a plastic composition sleeve slidable on said shaft, a stationary seal part disposed on said sleeve having a polished end face, a casing surrounding a portion of said stationary seal part, a spring between said casing and said seal part urging the seal part out of the casing, a pair of rubber O rings sealingly engaging each other and sealingly connecting the part with the stationary seal part, a plastic composition bushing on said shaft having an active sealing end face around the shaft, and a clamp assembly on said bushing radially deforming the same into sealing relation with said shaft.

4. A shaft seal construction comprising a plastic composition bushing having a shoulder therearound and a tapered portion, a ferrule ring on said bushing bottomed on said shoulder, a clamping ring on said tapered portion, a housing receiving the bushing, ferrule and clamping ring assembly, means on said housing abutting the ferrule for holding the assembly in the housing, screws threaded into the housing thrusting on said clamping ring to radially deform the bushing into sealing clamped relation on a shaft, a metal seal member disposed around the shaft, and means urging the metal member into sliding sealing engagement with the bushing.

5. In a shaft seal construction, a plastic composition bushing adapted to fit around a shaft, said bushing having a shoulder thereon, a metal ferrule on said bushing bottomed on said shoulder and having diametrically opposed slots through the periphery thereof, a clamping ring on said bushing having diametrically opposed slots through the periphery thereof, a housing having an open end and an apertured end wall spaced from the open end, pins projecting into said open end arranged to fit through the slots of the clamping ring and ferrule and to abut the ferrule for holding the bushing in the housing when misaligned with the slots, and screws threaded through said end wall of the housing for forcing the clamping ring toward the ferrule to deform the bushing into sealing gripping relation on a shaft.

OSCAR G. ODELIUS.

REFERENCES CITED

The following references are of record in the file of this patent:

UNITED STATES PATENTS

| Number | Name | Date |
|---|---|---|
| 2,321,871 | Stevenson | June 15, 1943 |
| 2,348,405 | Odelius | May 9, 1944 |
| 2,192,660 | Johnson | Mar. 5, 1940 |
| 2,222,654 | Donaldson | Nov. 26, 1940 |
| 2,365,046 | Bottomley | Dec. 12, 1944 |